United States Patent Office 3,122,547
Patented Feb. 25, 1964

3,122,547
2,4,7-TRIAMINO-6-PTERIDINE CARBOXAMIDES
Thomas S. Osdene, West Chester, and Arthur A. Santilli, Ardmore, Pa., assignors to American Home Products Corporation, New York, N.Y., a corporation of Delaware
No Drawing. Filed Dec. 3, 1962, Ser. No. 241,524
4 Claims. (Cl. 260—251.5)

This invention relates to novel pteridine compounds having valuable pharmacological properties.

More specifically, this invention is concerned with 2,4-7-triamino-6-substituted-pteridines and in particular with those compounds of this class which have the following general formula:

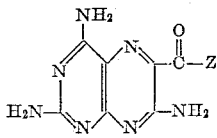
(I)

wherein Z represents:

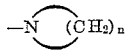

where $n$ is an integer ranging from 4 to 6; or

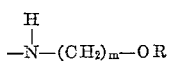

where $m$ is an integer ranging from 2 to 3 and R is a straight chain or branched alkyl group having from 1 to 4 carbon atoms.

A preferred synthesis for the novel compounds of this invention involves the reaction, in an anhydrous neutral polar solvent in the presence of a basic catalyst, of 2,4,6-triamino-5-nitrosopyrimidine (II) with a 2-cyano-N-(substituted)-acetamide or with a N-cyanoacetylpolymethyleneimine (III).

The reaction mixture is heated at temperatures of above 50° C. and below 200° C. and preferably at the boiling temperature of the selected inert solvent. This reaction is run for about 20 minutes to 2 hours and proceeds as follows:

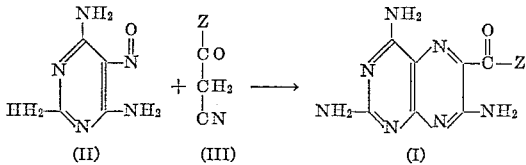

where Z is as hereinabove stated.

Suitable inert solvents for this reaction include methanol, ethanol, 2-ethoxyethanol ("Cellosolve"), butanol, 2-methoxyethanol, methoxy and ethoxy propanols, dimethyl formamide, diethyl formamide and dimethyl acetamide.

Basic catalysts suitable for promoting the above-outlined reaction include the alkali metals, their alkoxides and their alkoxy alkoxides. Preferred among these are sodium metal, sodium methoxide and sodium α-ethoxy ethoxide.

The following examples illustrate the best mode of carrying out the invention.

Example 1

To a solution of 1.0 g. of sodium in 500 ml. of dry 2-ethoxyethanol was added 6.16 g. of 2,4,6-triamino-5-nitrosopyrimidine, and the mixture was stirred mechanically and brought to boiling point. This was followed by the addition of 7.37 g. of 2-cyano-N-(3-isopropoxypropyl) acetamide. The mixture was then boiled under reflux for 1 hour during which time the red solution turned dark brown. The solution thus obtained was concentrated almost to dryness, and the residue was treated with 100 ml. of water when a brown material was deposited, M.P. 265–270° C. Fractional crystallization from ethanol, followed by recrystallization from the same solvent gave 2,4,7 - triamino - N - (3 - isopropoxypropyl) - 6 - pteridine-carboxamide, as yellow hygroscopic crystals, M.P. 278° C.

*Analysis.*—Calculated: C=48.74, H=6.29, N=34.98. Found: C=48.43, H=6.67, N=34.39.

Example 2

2,4,7 - triamino - N - (2 - ethoxyethyl) - 6 - pteridine-carboxamide is prepared from 6.9 g. of 2-cyano-N-(2-ethoxyethyl) acetamide and 6.16 g. of 2,4,6-triamino-5-nitrosopyrimidine, as described in Example 1.

Example 3

2,4,7 - triamino - N - (2 - methoxyethyl) - 6 - pteridine-carboxamide is prepared from 6.44 g. of 2-cyano-N-(2-methoxyethyl) acetamide and 6.16 g. of 2,4,6-triamino-5-nitrosopyrimidine, as described in Example 1.

Example 4

2,4,7 - triamino - N - (3 - butoxypropyl) - 6 - pteridine-carboxamide is prepared from 7.28 g. of 2-cyano-N-(3-butoxypropyl) acetamide and 6.16 g. of 2,4,6-triamino-5-nitrosopyrimidine, according to essentially the same procedure of Example 1.

Example 5

To a stirred solution of 1.03 g. of sodium metal in 500 ml. of absolute "Cellosolve" was added 6.16 g. of 2,4,6-triamino-5-nitrosopyrimidine. The mixture was heated under reflux and 9.5 g. of N-cyanoacetyl hexamethylene-imine was added. Heating under reflux was continued for 2 hours, during which time some solid material was deposited out of solution. The reaction mixture was filtered and the filtrate was concentrated to dryness on the rotary evaporator. The residue was then triturated with 100 ml. of water to give a yellow solid. Crystallization of the product from "Cellosolve" afforded 1-(2,4,7-tri-amino - 6 - pteridylcarbonyl) - hexamethyleneimine; M.P. 305–6° C.

*Analysis.*—Calculated: C=51.64, H=6.00, N=37.07. Found: C=51.27, H=6.32, N=36.43.

Example 6

To a solution of 1.0 g. of sodium in 400 ml. of dry 2-ethoxyethanol was added 6.16 g. of 2,4,6-triamino-5-nitrosopyrimidine, and the solution was stirred and brought to boiling point. This was followed by the addition of 6.84 g. of 1-cyanoacetylpiperidine and the mixture was boiled under reflux for 20 minutes. The mixture was cooled and the red precipitate which was present was removed by filtration and discarded. Concentration of the filtrate afforded a light brown material, wt.=4.6 g.; M.P. 300–310° (decomposition). Several recrystallizations from aqueous 2-ethoxyethanol yielded yellow crystals of 1-(2,4,7 - triamino - 6 - pteridylcarbonyl)piperidine, M.P. 305–307° (decomposition).

*Analysis.*—Calculated: C=49.99, H=5.59, N=38.87. Found: C=49.73, H=6.01, N=38.67.

Example 7

By reaction of 6.16 g. of 2,4,6-triamino-5-nitrosopyrimidine with 6.28 g. of 1-cyanoacetylpyrrolidine, 1-(2,4,7-triamino-6-pteridylcarbonyl)pyrrolidine is obtained, as in Example 6.

The compounds of this invention are useful in experimental pharmacology. Those compounds where Z represents

generally exhibit diuretic and antiviral activities. Those compounds where Z represents

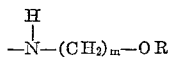

exhibit antiviral activity, in particular against herpes simplex.

The compounds of this invention, which have proven useful in experimental pharmacology, can be administered in a wide variety of oral or parenteral unit dosage forms singly, or in admixture with other active compounds.

The present invention also includes the process of bringing the compounds thereof into a form suitable for therapeutic administration by associating them with liquid or solid pharmaceutical carriers.

Various changes and modifications of this invention can be made by those skilled in the art to which it relates and to the extent that such variations incorporate the spirit of the invention, they are included in the scope of the claims.

What is claimed is:

1. A compound having the formula:

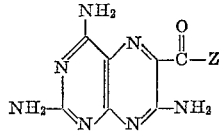

wherein Z is selected from the group consisting of:

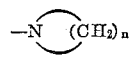

where $n$ is an integer ranging from 4 to 6; and

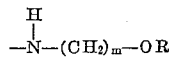

where $m$ is an integer ranging from 2 to 3 and R is an alkyl group having from 1 to 4 carbon atoms.

2. 2,4,7 - triamino - N - (3 - isopropoxypropyl) - 6-pteridinecarboxamide.

3. 1-(2,4,7-triamino - 6 - pteridylcarbonyl) hexamethyleneimine.

4. 1-(2,4,7-triamino-6-pteridylcarbonyl)-piperidine.

References Cited in the file of this patent

Osdene et al.: J. Chem. Soc., London (1955), pages 2036–38.